United States Patent [19]
Ikeda et al.

[11] Patent Number: 6,100,929
[45] Date of Patent: *Aug. 8, 2000

[54] IMAGE-TAKING SYSTEM IN WHICH A HIGH RESOLUTION IMAGE HAVING SUPPRESSED COLOR MOIRE IS OBTAINED

[75] Inventors: Masato Ikeda, Higashikurume; Takashi Sasaki, Chigasaki; Nobuhiro Takeda, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/731,570

[22] Filed: Oct. 16, 1996

[30] Foreign Application Priority Data

Oct. 20, 1995 [JP] Japan ................................. 7-272872

[51] Int. Cl.[7] ............................ H04N 5/225; H04N 9/68; H04N 3/14
[52] U.S. Cl. .......................... 348/262; 348/219; 348/236; 348/273
[58] Field of Search ..................................... 348/234, 237, 348/241, 272, 273, 280, 262, 236, 259, 218, 219

[56] References Cited

U.S. PATENT DOCUMENTS

| | | | |
|---|---|---|---|
| 3,911,479 | 10/1975 | Sakurai | 358/44 |
| 4,823,186 | 4/1989 | Muramatsu | 348/236 |
| 4,876,591 | 10/1989 | Muramatsu | 348/236 |
| 4,998,164 | 3/1991 | Endo et al. | 348/219 |
| 5,237,363 | 8/1993 | Okada et al. | 354/412 |
| 5,561,460 | 10/1996 | Katoh et al. | 348/219 |
| 5,737,017 | 4/1998 | Udagawa et al. | 348/273 |
| 5,745,171 | 4/1998 | Ogawa et al. | 348/273 |

FOREIGN PATENT DOCUMENTS

| | | | |
|---|---|---|---|
| 0272634 | 6/1988 | European Pat. Off. | H04N 9/04 |
| 0416876 | 3/1991 | European Pat. Off. | H04N 9/04 |
| 0522647 | 1/1993 | European Pat. Off. | H04N 5/225 |
| 4142892 | 5/1992 | Japan | H04N 5/335 |
| 6189318 | 7/1994 | Japan | H04N 9/07 |
| 250649 | 9/1994 | Japan | G10H 1/00 |
| 1441553 | 7/1976 | United Kingdom | H04N 9/07 |

*Primary Examiner*—Wendy Garber
*Assistant Examiner*—Luong Nguyen
*Attorney, Agent, or Firm*—Fitzpatrick, Cella, Harper & Scinto

[57] ABSTRACT

First and second optical images of an object are respectively taken using two optical filters, having different optical transfer properties, which are placed one at a time in the optical path of the taken images. The first and second optical images are converted to first and second memories, respectively. The first digital signal indicative of the first optical image is provided to a luminance-signal generator which produces a luminance signal. The second digital signal indicative of the second optical image is provided to a color-signal generator which produces a color signal. A combining unit combines the luminance signal and the color signal to produce a single image signal of the object having a suppressed color moire. An image reproduction device receives the single image signal to reproduce the image of the object.

10 Claims, 11 Drawing Sheets

| G | G | G | G |
|---|---|---|---|
| G | G | G | G |
| G | G | G | G |
| G | G | G | G |

FIG. 15

| B | R | B | R |
|---|---|---|---|
| R | B | R | B |
| B | R | B | R |
| R | B | R | B |

IMAGE-TAKING SYSTEM IN WHICH A HIGH RESOLUTION IMAGE HAVING SUPPRESSED COLOR MOIRE IS OBTAINED

BACKGROUND OF THE INVENTION

1. Field of the Invention

The present invention relates to an image-taking system using a solid-state imaging device, and more particularly, to an image-taking system in which a spatial frequency band is limited for an object of which an image is taken, before sampling is performed by a solid-state imaging device.

2. Description of the Related Art

In an image-taking system using a solid-state imaging device, sampling is performed for an image of an object formed on the solid-state imaging device. Therefore, when an image of an object including a spatial frequency component having a frequency which is determined by the interval of pixel positions on the solid-state imaging device and which is equal to or greater than the Nyquist frequency is taken, aliasing occurs and moire appears in the image obtained from the solid-state imaging device. Thus, image quality is deteriorated.

To suppress the moire in such an image-taking system, an optical low-pass filter (hereinafter called optical LPF) made up of a quartz plate is usually placed between a lens and the solid-state imaging device, and frequencies equal to or greater than the Nyquist frequency are removed by using the double refraction effect of the quartz to form a clearer image.

Since an optical LPF in which the double refraction effect of quartz is used does not have characteristics in which frequencies less than the Nyquist frequency is 100% transmitted and frequencies equal to or more than the Nyquist frequency are 100% suppressed, the resolution achieved by frequencies less than the Nyquist frequency is also reduced. This is so, since moire and the resolution are trade-offs.

In a single-device color image-taking system in which a color-filter array is made on the surface of a solid-state imaging device, the Nyquist frequency with respect to one color is different from the Nyquist frequency with respect to all pixels. When an optical LPF having characteristics in which a frequency band having frequencies equal to or greater than the Nyquist frequency with respect to colors is reduced is used to suppress color moire, the resolution is reduced. When an optical LPF having a frequency band up to the Nyquist frequency with respect to all pixels is used to increase the resolution, the resolution is sure to increase, however color moire also increases. Therefore, it is difficult to increase the resolution as well as to suppress moire at the same time.

SUMMARY OF THE INVENTION

Accordingly, it is an object of the present invention to provide an image-taking system in which the foregoing problems are solved and a high-resolution image having suppressed color moire is obtained.

The foregoing object is achieved according to one aspect of the present invention through the provision of an image-taking system including: a solid-state imaging device for taking an image of an object; image-forming means for forming an image of the object on the solid-state imaging device; generating means for generating two or more different optical transfer functions when an image of the object is formed; combining means for obtaining a plurality of images taken with two or more different optical transfer functions generated by the generating means and for forming a single image by combining the plurality of images.

The foregoing object is also achieved according to another aspect of the present invention through the provision of an image-taking system including: a plurality of solid-state imaging devices; image-forming means for forming images of an object on the plurality of solid-state imaging devices;

generating means for generating different optical transfer functions for the plurality of solid-state imaging devices;

combining means for forming a single image by combining a plurality of images taken by the plurality of solid-state imaging devices having a plurality of different optical transfer functions.

According to the present invention, a plurality of signals corresponding to images taken with different optical transfer functions by a solid-state imaging device is obtained, and the plurality of image signals are combined by a combining means to obtain a single high-resolution image having suppressed color moire.

It is especially preferred that different optical functions are generated by placing or removing an optical LPF (optical device) or by the total sum of the image forming time at each position obtained when the relative position of an image formed on the imaging device against the imaging device is changed in time. This is because the signals of images taken with different spatial frequencies are obtained from one imaging device, and the cost of the system can be reduced.

Other objects and features of the present invention will be clearly understood with the following descriptions and attached drawings.

DESCRIPTION OF THE PREFERRED EMBODIMENTS

Figure 1:
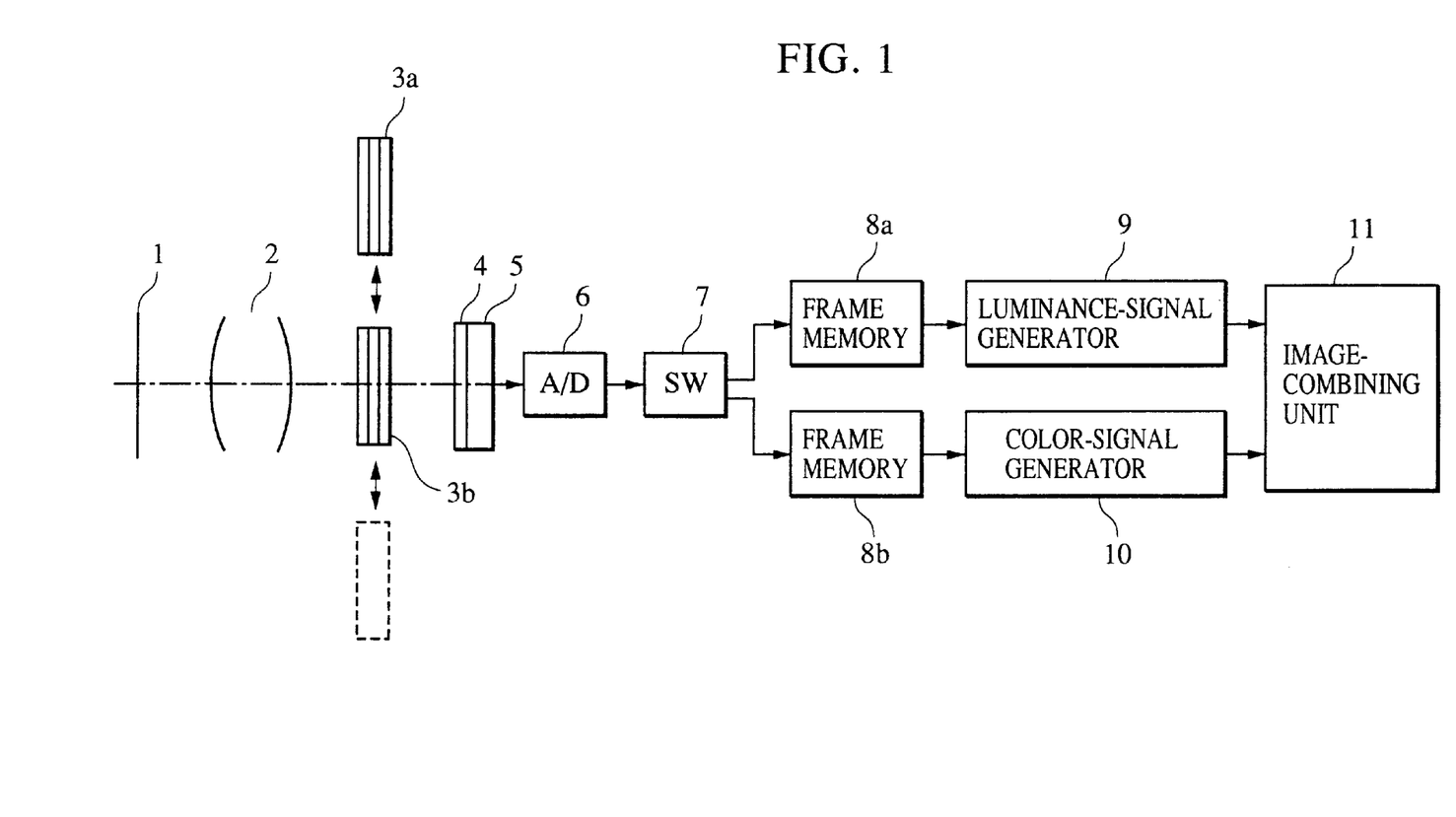
FIG. 1 is a block diagram showing a first embodiment of the present invention.

FIG. 1 shows an image-taking system according to a first embodiment of the present invention. There is shown an object 1 of which an image is taken, an image-taking lens 2, optical LPFs 3a and 3b, a solid-state imaging device 5, a color-filter array 4 made on the surface of the solid-state imaging device 5, an A/D converter 6, a switch 7, frame memory units 8a and 8b, a luminance-signal generator 9, a color-signal generator 10, and a image-combining unit 11.

Figure 2:
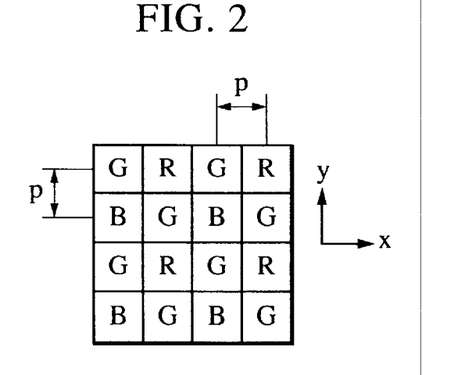
FIG. 2 is a block diagram of a color-filter array.
Figure 3:
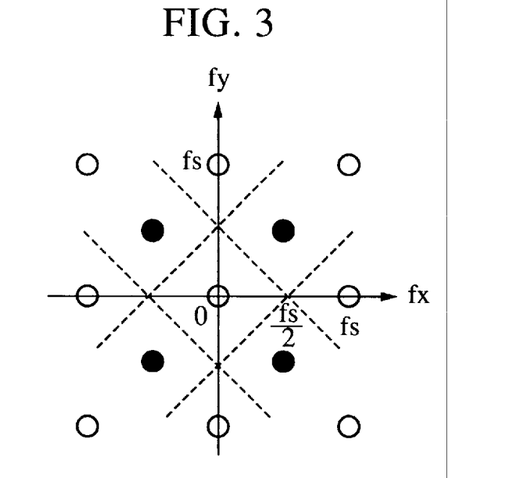
FIG. 3 is a view showing the green carrier.
Figure 4:
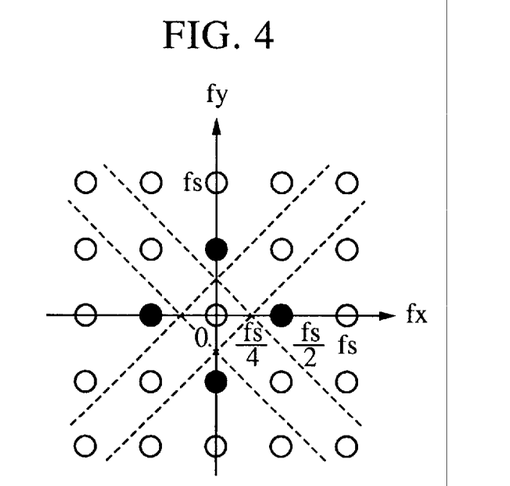
FIG. 4 is a view showing color carriers.

The operation of the image-taking system is described below. An image of the object 1 is formed on the solid-state imaging device 5 through the optical LPF 3a or 3b by the image-taking lens 2. As shown in FIG. 2, the color-filter array 4 which has pure-color filters, made up of red (R), green (G), and blue (B) filters, is created on the solid-state imaging device 5. Assuming that the sampling frequency corresponding to the pitch p of pixel positions in the solid-state imaging device 5 is $f_s=1/p$, a G carrier is generated at positions indicated by ○ in FIG. 3 and color carriers are generated at positions indicated by ○ in FIG. 4. The optical LPF 3a has optical LPF transfer property or characteristic (function) in which a response is zero at positions on a dotted line in FIG. 3. The optical LPF 3b has a different optical LPF transfer property or characteristic (function) in which a response is zero at positions on a dotted line in FIG. 4. Since only one of the optical LPFs 3a and 3b is used at a given time by placing and removing them by a driving unit (not shown), the optical LPF transfer property or characteristic (function) of the system can be changed.

An image is taken with the optical LPF 3a being disposed in the optical path. A luminance-component image formed on the solid-state imaging device 5 is converted to a digital signal by the A/D converter 6 and is stored in the frame memory 8a through the switch 7. Then, the optical LPF 3a is retracted and an image is taken with the optical LPF 3b being disposed in the optical path. A color-component image is converted to the digital signal by the A/D converter 6 and is stored in the frame memory 8b through the switch 7.

Figure 5:
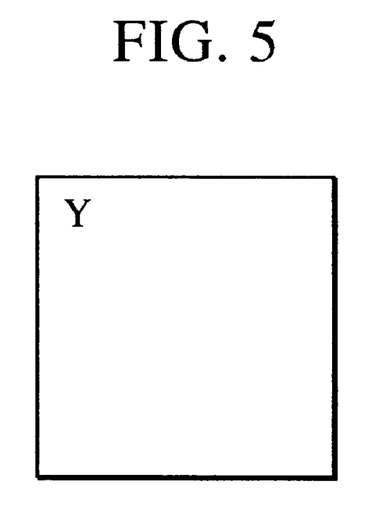
FIG. 5 is a view showing a luminance signal for a frame generated by a luminance-signal generator.
Figure 6:
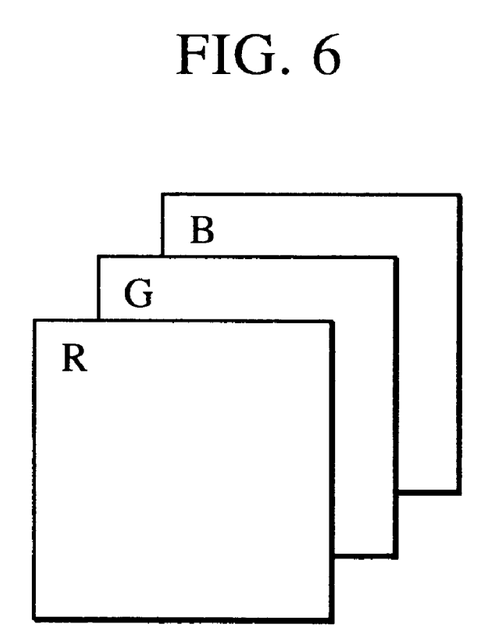
FIG. 6 is a view showing color signals for a frame generated by a color-signal generator.

The luminance-signal generator 9 receives the signal corresponding to the G filter output from the luminance-component image signal stored in the frame memory 8a, and interpolates the signal to generate a luminance signal Y for a frame shown in FIG. 5. The color-signal generator 10 receives the signals corresponding to the R, G, and B filter outputs from the color-component image signals stored in the frame memory 8b, and interpolates the signals to generate R, G, and B color signals for a frame shown in FIG. 6. The image combining unit 11 combines the luminance signal Y including high-frequency components obtained from the luminance-component image, which is formed with the use of the optical LPF 3a, and the R, G, and B color signals in which high-frequency components obtained from the color-component image formed with the use of the optical LPF 3b are suppressed, to form an image by an image forming unit (not shown) in which the resolution is not reduced and there is only a limited color moire.

Figure 18:
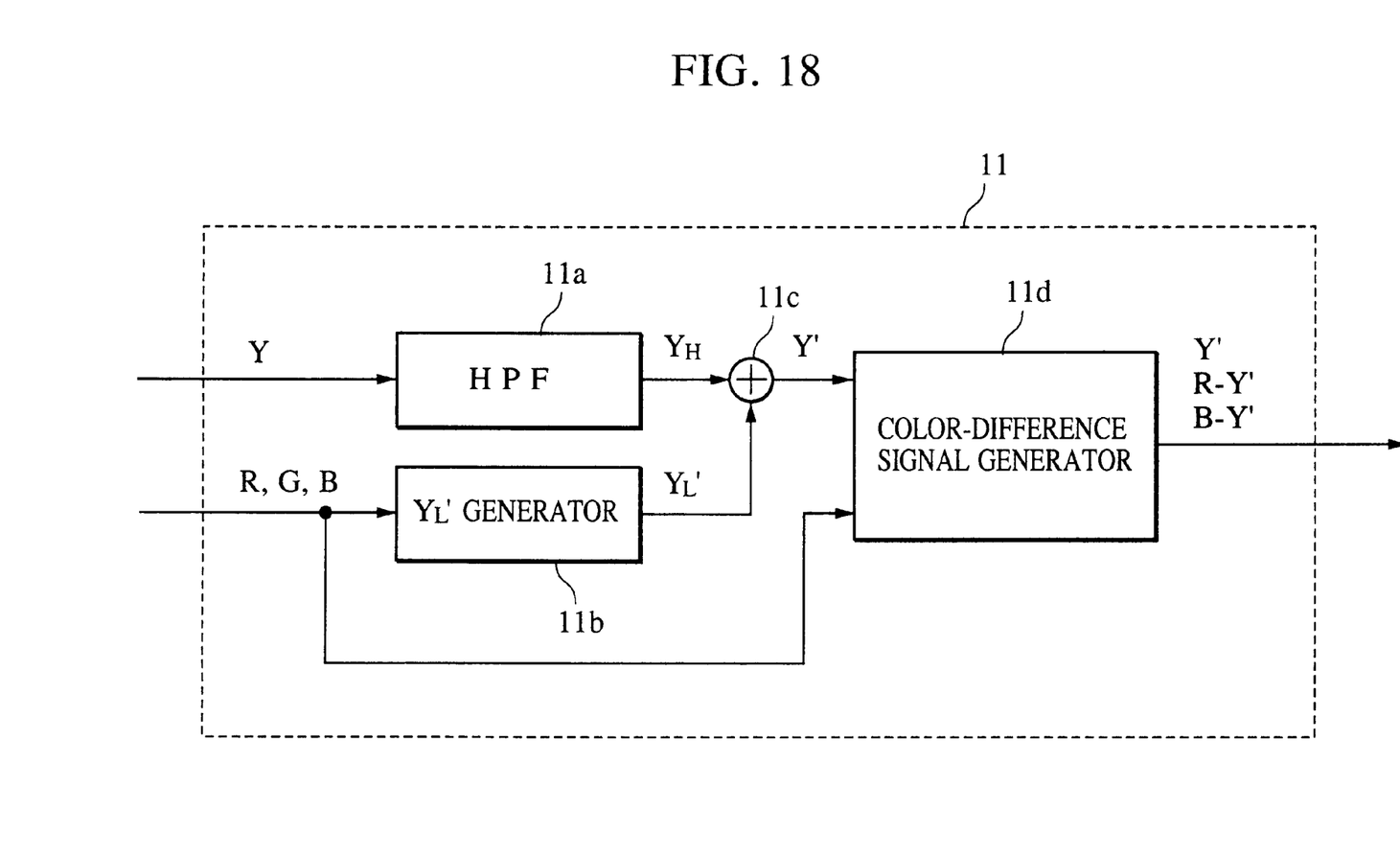
FIG. 18 is a block diagram showing the configuration of an image combining section.
Figure 19:
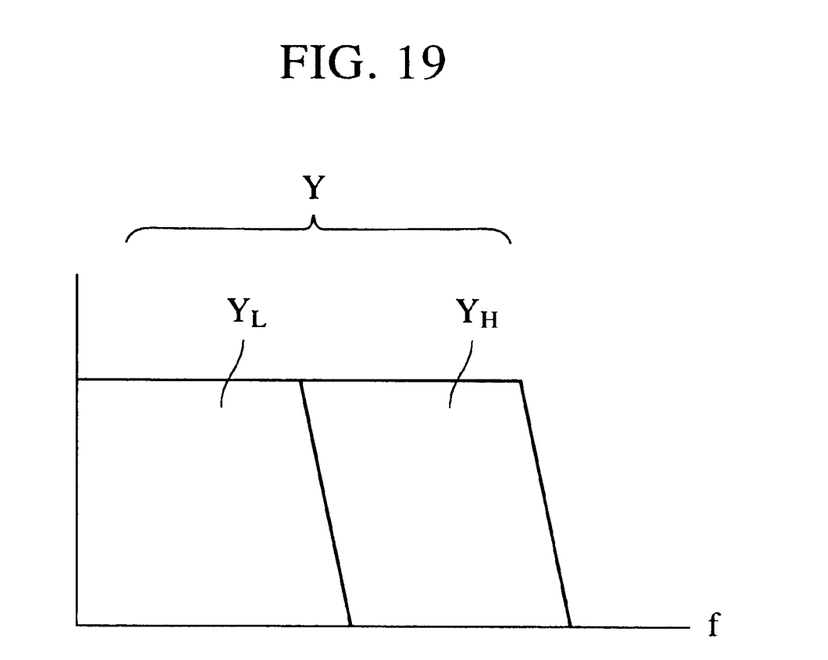
FIG. 19 is a block diagram showing the configuration of a luminance signal.

FIG. 18 shows the configuration of the image combining unit 11. There is shown a high-pass filter 11a, a $Y_L'$ generator 11b, an adder 11c, and a color-difference-signal generator 11d. The luminance signal Y ($Y=Y_L+Y_H$) generated by the luminance-signal generator 9 includes a low-frequency component $Y_L$ and a high-frequency component $Y_H$ as shown in FIG. 19. When the signal Y passes through the high-pass filter 11a, the high-frequency luminance component $Y_H$ is passed and the low frequency component $Y_L$ is suppressed. The R, G, and B color signals generated by the color-signal generator 10 are based on the color-component image which is taken with the use of the optical LPF 3b and in which a high-frequency component is suppressed. In the $Y_L'$ generator 11b, a low-frequency luminance signal $Y_L'$ is generated from the R, G, and B color signals. The adder 11c produces a luminance signal $Y'=Y_H+Y_L'$ by adding the high-frequency luminance component $Y_H$ to the low-frequency luminance signal $Y_L'$. The color-difference-signal generator 11d produces a combined image signal made from color difference signals R−Y' and B−Y', and the luminance signal Y'. In response to the provision of the combined image signal, an image forming device (not shown) forms a single image of the object.

An optical LPF uses diffraction, or the double-refraction effect, which is achieved, for example, by using a quartz plate.

In this embodiment, the two optical LPFs 3a and 3b having different optical transfer properties or characteristics (functions) are used to change the optical LPF properties or characteristics (functions) of the system. A dummy glass which compensates for an optical path may be used instead of the optical LPF 3a. Images are taken with the dummy glass being disposed or with the optical LPF 3b being disposed in the optical path, in order to reduce the cost of the system.

In this embodiment, only the signal corresponding to the G color filter in the luminance-signal generation image is used to generate the luminance signal Y. The luminance signal Y may be produced with the use of a signal corresponding to all of the pixels, including the signal components corresponding to the R and B color filters.

In this embodiment, the sampling frequencies corresponding to the pixel pitches in the x direction and in the y direction are equal since a solid-state imaging device having square pixels or similar-shape pixels is used. When a solid-state imaging device having not-square pixels is used, an optical LPF suited to the device needs to be employed.

Figure 7:
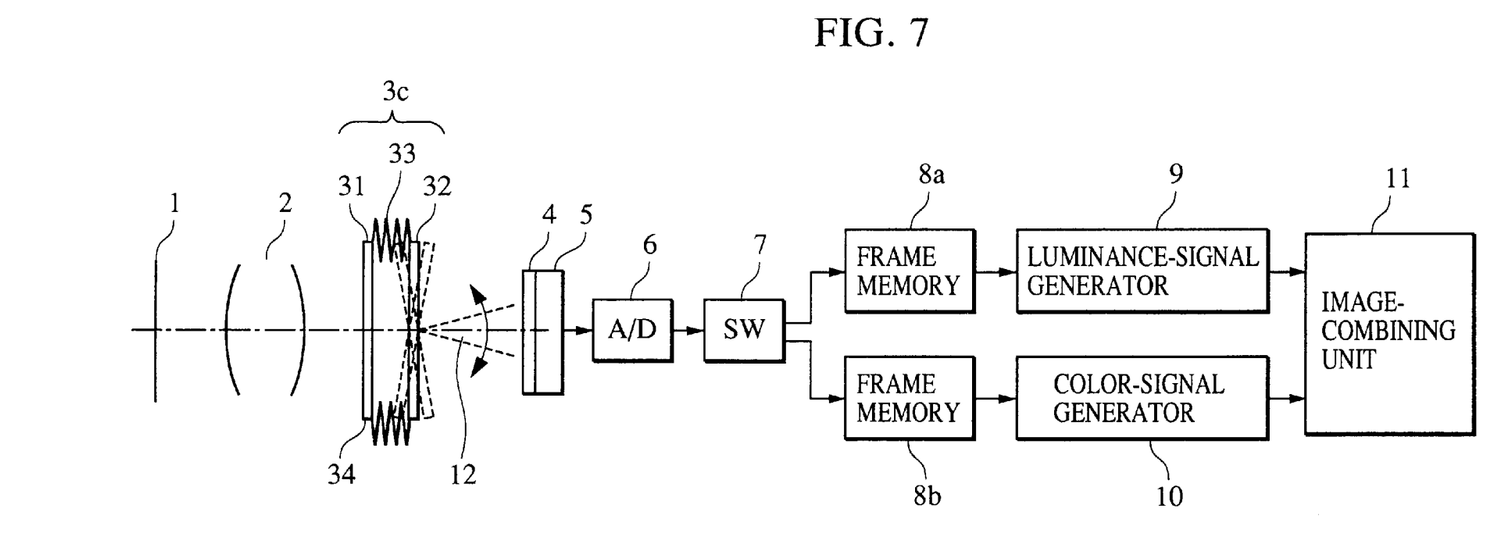
FIG. 7 is a block diagram showing a second embodiment of the present invention.

FIG. 7 shows an image-taking system according to a second embodiment of the present invention. The same portions as those shown in FIG. 1 are indicated by the same symbols, and the descriptions thereof are omitted here.

There is shown a variable apical-angle prism 3c. This variable apical-angle prism 3c includes a pair of glass plates 31 and 32 disposed separately in the direction of an optical axis and opposing each other, a bellows member 33 which combines the outer peripheral sections of the glass plates 31 and 32 to form a sealed space, and a liquid 34 having the specified refractive index with which the space enclosed by the glass plates 31 and 32, and the bellows member 33 is filled. The prism 3c shifts the optical axis 12 by slanting the glass plate 32 with the use of a two-axis control driving system (not shown).

Only the operation of the system which differs from those of the system described in the first embodiment is described below. The variable optical-angle prism 3c corresponds to a means for generating two or more different optical transfer properties or characteristics (functions). By moving the variable optical-angle prism 3c with the use of a not-shown driving system, the position of an image formed on the solid-state imaging device 5 is shifted. As a result, the image formed on the solid-state imaging device 5 is moved on a plurality of pixel positions on the imaging device 5. The corresponding image formed by charges accumulated by the solid-state imaging device 5 within one exposure period T passes through filters having different optically transfer properties or characteristics (functions) obtained by moving the glass plate 32 of the variable apical-angle prism 3c.

Figure 8:
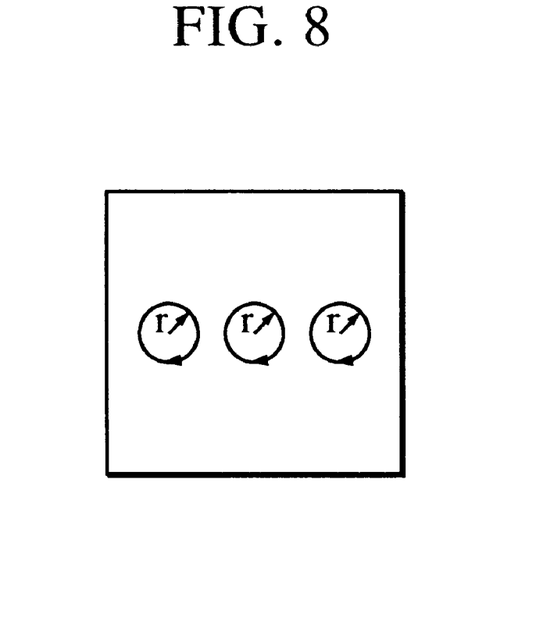
FIG. 8 is a block diagram showing a state in which an image to be formed on a solid-state imaging device moves.

FIG. 8 shows a state in which an image formed on the solid-state imaging device 5 moves. The glass plate 32 is moved such that all points of an image formed on the solid-state imaging device 5 move at a constant speed on the circumference of a circle having a radius r.

As shown in FIG. 2, the color-filter array 4 which has the R, G, and B pure-color filters is formed on the solid-state imaging device 5. Assuming that the sampling frequency corresponding to the pitch p of the pixels is $f_s=1/p$, a G carrier is generated at positions indicated by ○ in FIG. 10 and color carriers are generated at positions indicated by ○ in FIG. 11. To suppress moire caused by carriers indicted by •, it is necessary to use a LPF which suppresses components having the Nyquist frequency or a greater frequency in each carrier.

Figure 9:
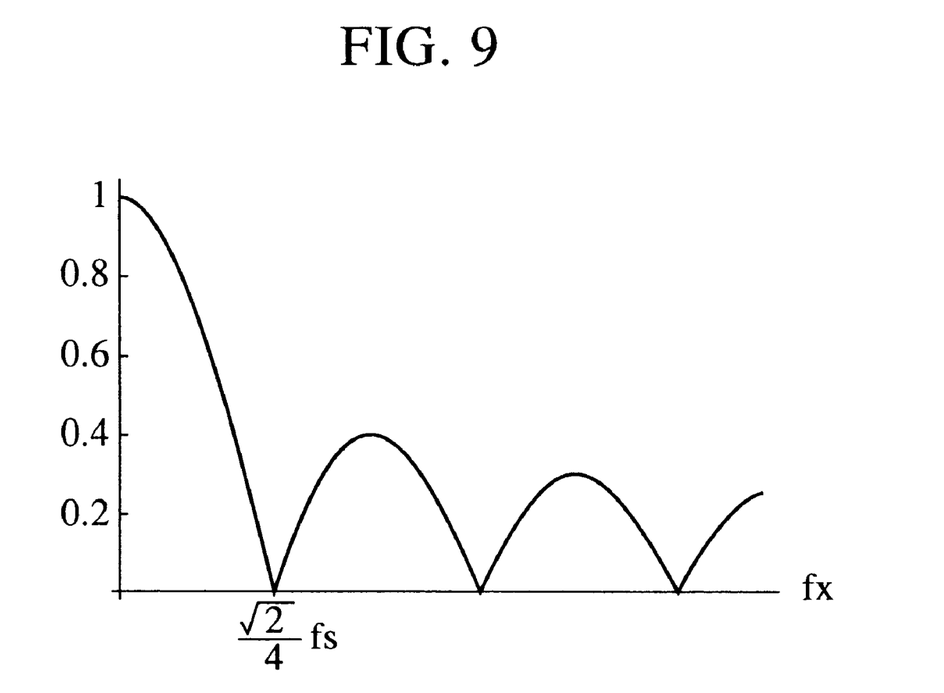
FIG. 9 is a view showing an optical transfer function at $f_y=0$.
Figure 10:
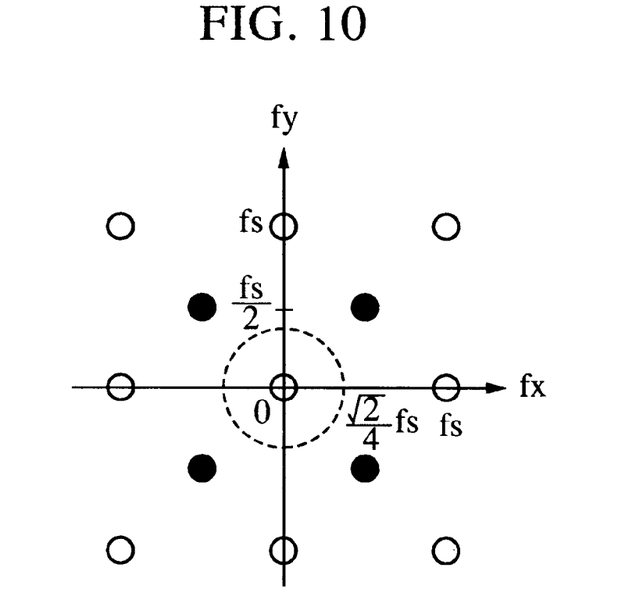
FIG. 10 is a view showing the green carrier.

The radius of a circle on which each point of an image formed on the solid-state imaging device moves is set to $r_Y$ and the glass plate is moved so that the response becomes zero on the circumference indicated by a dotted line in FIG. 10. Then, moire caused by the G carrier is suppressed. The image obtained when the radius $r_Y$ is used is used as a luminance-component image. In this case, the optical transfer function with $f_y$ being set to 0 is obtained as shown in FIG. 9, and the second-order optical transfer function is obtained as shown in FIG. 10, which is acquired by rotating FIG. 9 with its vertical axis being set to the rotation axis.

Figure 11:
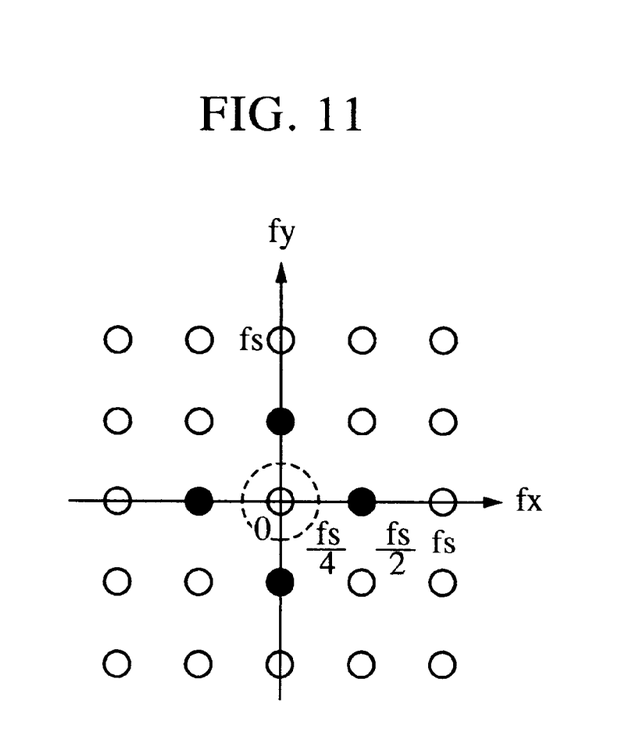
FIG. 11 is a view showing color carriers.

The radius of a circle on which each point of an image formed on the solid-state imaging device moves is set to $r_C$ and the glass plate is moved so that the response becomes zero on the circumference indicated by a dotted line in FIG. 11. Then, moire caused by the color carriers is suppressed. The image obtained when the radius $r_C$ is used is used as a color-component image.

In this embodiment, the glass plate 32 is moved such that all points on an image formed on the solid-state imaging device move on the circumference of a circle having the radius $r_Y$ when a luminance-component image is taken, and move on the circumference of a circle having the radium $r_C$ when a color-component image is taken, in order to change the LPF characteristics. A luminance-signal image can be taken with the glass plate 32 being secured.

In this embodiment, the solid-state imaging device 5 has square pixel positions or similar-shape pixel positions. Therefore the sampling frequencies corresponding to the pixel pitches in the x direction and in the y direction are equal, and the glass plate 32 is moved such that all points of an image formed on the solid-state imaging device 5 move at a constant speed on the circumference of a circle having a radius r, as shown in FIG. 8. When not-square pixels are used, the glass plate 32 needs to be moved such that all points of an image formed on the solid-state imaging device 5 move on an ellipse.

Figure 12:
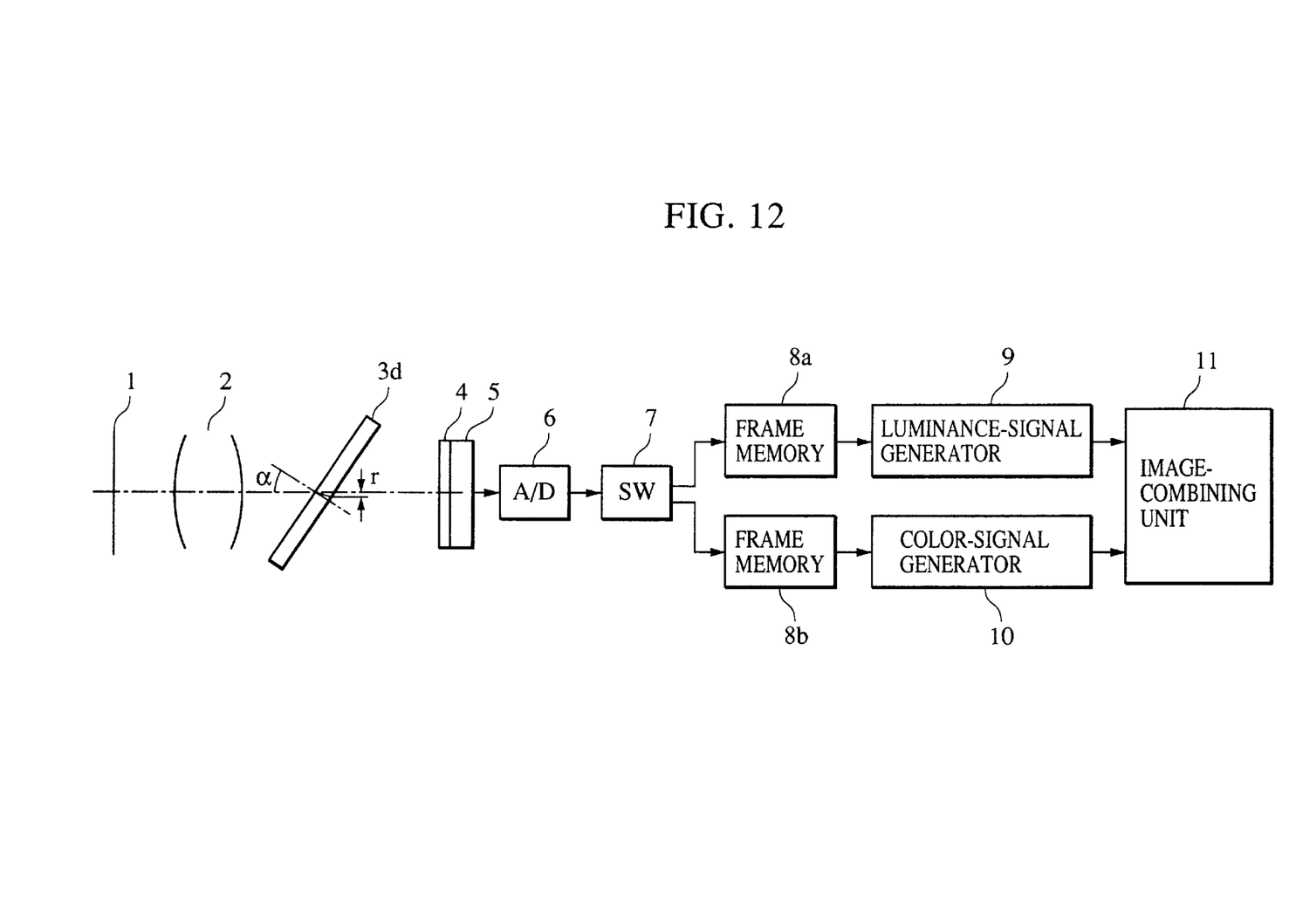
FIG. 12 is a block diagram showing a third embodiment of the present invention.

FIG. 12 shows an image-taking system according to a third embodiment of the present invention. The same elements as those shown in FIGS. 1 and 7 are designated by the same numbers, and the descriptions thereof are omitted.

There is shown a parallel plate glass 3d. The parallel plate glass 3d is disposed such that a specified angle α is formed between the optical axis of an image-taking lens 2 and the perpendicular of the parallel plate glass 3d. The parallel plate glass 3d is rotated by a not-shown driving system about the optical axis of the image-taking lens 2, which is used as a rotation axis, while the angle formed by the perpendicular of the parallel plate glass 3d and the optical axis of the image-taking lens 2 is constant. The angle α can also be changed.

Only the operation of this system which differs from those of the system described in the second embodiment is described below. Luminous flux from the image-taking lens 2 shifts in parallel by the distance r when it passes through the parallel plate glass 3d. By rotating the parallel plate glass 3d with the specified angle α being maintained, by the not-shown driving system about the optical axis of the image-taking lens 2, all points of an image formed on the solid-state imaging device 5 move on the circumference of a circle having radius r. As a result, the image formed on the solid-state imaging device 5 is moved on a plurality of pixel positions on the imaging device 5. The corresponding image formed by charges accumulated by the solid-state imaging device 5 within one exposure period T passes through filters having different optical transfer properties or characteristics (functions) obtained by changing the angle α of the parallel plate glass 3d.

To take an image used for a luminance component, as described in the second embodiment, all points on an image formed on the solid-state imaging device 5 need to move at a constant speed on the circumference of a circle having a radius $r_Y$ so that the response becomes zero on the circumference indicated by the dotted line in FIG. 10. The angle α corresponding to the parallel plate glass 3d is set to $α_Y$ such that all the points move on the circumference of the circle having radius $r_Y$. The luminance-signal image is obtained by rotating the parallel plate glass 3d about the optical axis of the image-taking lens 2.

To take an image used for a color component, all points on an image formed on the solid-state imaging device 5 need to move on the circumference of a circle having radius $r_C$ at a constant speed so that a response becomes zero on the circumference indicated by the dotted line in FIG. 11. The angle α corresponding to the parallel plate glass 3d is changed from $α_Y$ used for taking the luminance-component image to the angle $α_C$ such that all the points move on the circumference of the circle having radius $r_C$. The color-signal image is obtained by rotating the parallel plate glass 3d about the optical axis of the image-taking lens 2.

As described above, by changing the angle α corresponding to the parallel plate glass 3d, the optical transfer properties or characteristics (functions) change and the luminance-signal image and the color-signal image for which different LPF characteristics are used is obtained.

In this embodiment, the angle α corresponding to the parallel plate glass 3d is changed to two values $α_Y$ and $α_C$ to change the LPF characteristics such that all points of an image formed on the solid-state imaging device 5 move on the circumference of a circle having radius $r_Y$ when the luminance-signal image is taken and on the circumference of a circle having radius $r_C$ when the color-signal image is taken. The following method may be used. The luminance-signal image is taken with the angle α corresponding to the parallel plate glass 3d being fixed to $a_C$ without rotating the parallel plate glass 3d (LPF characteristics are not used). The color-signal image is taken by rotating the parallel plate glass 3d. Then, the angle α corresponding to the parallel plate glass 3d need not to be changed and cost reduction is achieved.

To move an image on the solid-state imaging device 5, a variable optical-angle prism is used in the second embodiment and the parallel plate glass slanted against the optical axis is used in the third embodiment. An optical device used for moving an image is not limited to these devices. As disclosed in Japanese Unexamined Patent Publication No. 6-250649, for example, a method in which various optical devices are moved and a method in which a solid-state imaging device itself is moved is used.

Figure 13:
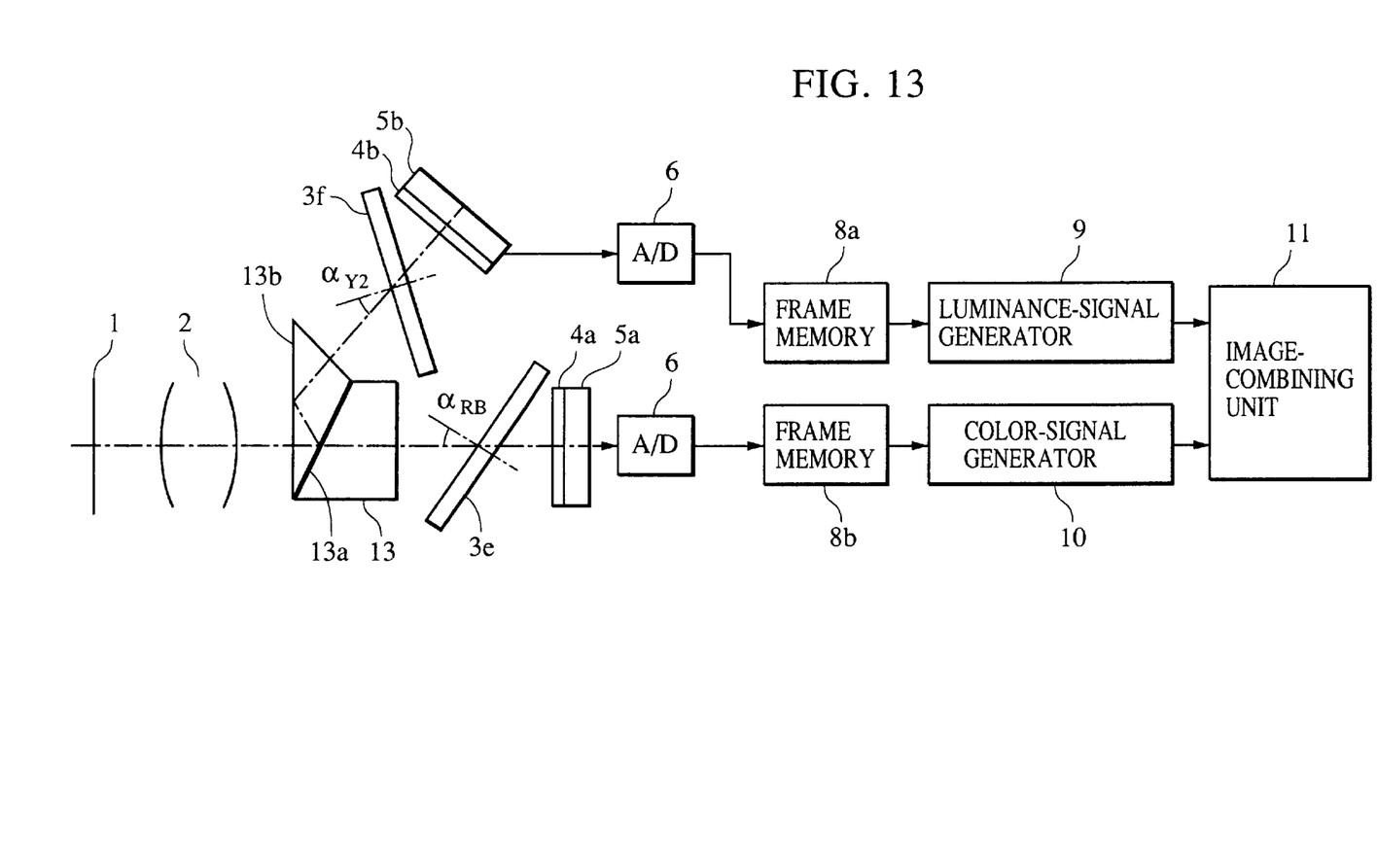
FIG. 13 is a block diagram showing a fourth embodiment of the present invention.

FIG. 13 shows an image-taking system according to a fourth embodiment of the present invention. The same elements as those shown in FIGS. 1, 7, and 12 are designated by the same numbers, and the descriptions thereof are omitted.

In FIG. 13, there is shown a two-color separating prism 13, a dichroic layer 13a, parallel plate glasses 3e and 3f, color-filter arrays 4a and 4b, and solid-state imaging devices 5a and 5b.

Only an operation different from that of the first embodiment is described below. The two-color separating prism 13 has two prism blocks and is provided at the boundary of the two prism blocks with the dichroic layer 13a which reflects green and is transparent to red and blue.

Figure 14:
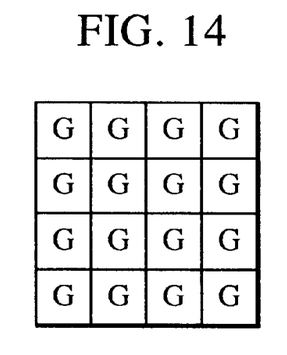
FIG. 14 is a block diagram of a color-filter array.

When luminous flux from an image-taking lens 2 is input to the two-color separating prism 13, the green component is reflected at the dichroic layer 13a and is again reflected at a total-reflection surface 13b. An image is formed on the solid-state imaging device 5b through a parallel plate glass 3f. As shown in FIG. 14, the color-filter array 4b made up of green filters is created on the solid-state imaging device 5b. The G carrier is generated at positions indicated by ○ in FIG. 16 assuming that the sampling frequency corresponding to the pixel pitch p is set to $f_s=1/p$.

Figure 15:
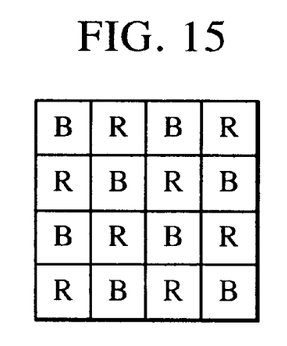
FIG. 15 is a block diagram of another color-filter array.
Figure 17:
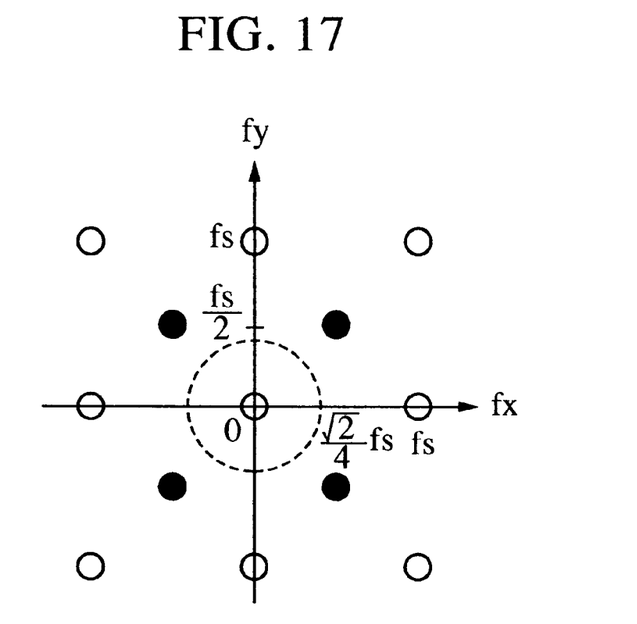
FIG. 17 is a view showing the red and blue carriers.

The red and blue components pass through the dichroic layer 13a and an image is formed on the solid-state imaging device 5a through a parallel plate glass 3e. As shown in FIG. 15, the color-filter array 4a made up of red and blue filters is created on the solid-state imaging device 5a. The R and B carriers are generated at positions indicated by ○ in FIG. 17 assuming that the sampling frequency corresponding to the pixel pitch p is set to $f_s=1/p$.

The parallel plate glasses 3e and 3f are disposed in the same way as in the third embodiment such that the specified angle α is formed between the perpendiculars to the parallel plate glasses 3e and 3f and the optical axes of luminous flux emitted from the two-color separating prism 13. These parallel plate glasses are rotated by a not-shown driving system about the optical axes of luminous flux emitted from the color separating prism 13, respectively, while the angle α formed by the perpendiculars to the parallel plate glasses and the optical axes of the luminous flux emitted from the two-color separating prism 13 is maintained.

By rotating the parallel plate glasses 3e and 3f with the specified angle α being maintained, by the not-shown driving system about the optical axes of luminous flux emitted from the two-color separating prism 13, all points of images formed on the solid-state imaging devices 5a and 5b move on the circumferences of circles having radius r. As a result, the images formed on the solid-state imaging devices 5a and 5b are moved on a plurality of pixel positions on the imaging devices 5a and 5b. The corresponding images formed by charges accumulated by the solid-state imaging devices 5a and 5b within one exposure period T pass through filters having different optical transfer properties or characteristics (functions) obtained by changing the angle α corresponding to the parallel plate glasses 3e and 3f.

Figure 16:
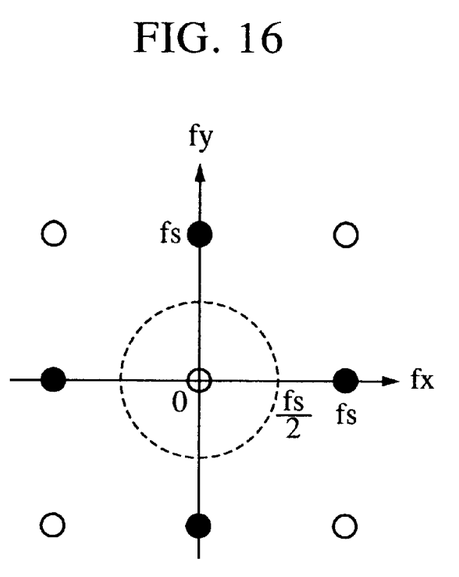
FIG. 16 is a view showing the green carrier.

Since the angle corresponding to the parallel plate glass 3f, which is transparent to the green component, is set to $α_{Y2}$ such that a response becomes zero at the circumference indicated by a dotted line in FIG. 16, moire caused by the green carrier is suppressed. The image obtained in this condition is used for the luminance-component image. Since the angle corresponding to the parallel plate glass 3e, which is transparent to the red and blue components, is set to $α_{RB}$ such that a response becomes zero at the circumference indicated by a dotted line in FIG. 17, moire caused by the red and blue carriers is suppressed. The image obtained in this condition is used for the color-component image.

As described above, by setting the angles corresponding to the parallel plate glasses 3e and 3f to different degrees, $α_{RB}$ and $α_{Y2}$, images having different optical transfer functions are obtained between the two solid-state imaging devices 5a and 5b.

What is claimed is:

1. An image-taking system comprising:

a solid-state imaging device for taking an image of an object;

image-forming means for forming a luminance-component image and a color-component image of the object serially on said solid-state imaging device;

generating means being moved such that every point on an image formed on said solid-state imaging device moves on the circumferences of a circle having a radius, and for generating optical transfer functions;

control means for controlling said generating means for changing said radius alternately to change the optical transfer functions generated by said generating means so that a luminance-component image is formed at a different radius from a color-component image;

storing means for storing the luminance-component image and the color-component image in order, formed with two or more different optical transfer functions generated by said generating means; and combining means for forming a single image by combining the luminance-component image and the color-component image readout from said storing means according to an image-generating operation.

2. An image-taking system according to claim 1, wherein said generating means generates an optical transfer function for the luminance-component image with a different radius than the radius used when said generating means generates the optical transfer function for the color-component image.

3. The image-taking system according to claim 1, wherein said generating means is a variable angle prism.

4. The image-taking system according to claim 1, wherein said generating means is a parallel plate glass which is rotated about an optical axis of an image-taking lens, which is used as a rotation axis, while the angle formed by the perpendicular of said parallel plate glass and the optical axis of the image-taking lens is constant.

5. An image-taking system comprising:

imaging means for taking at least one image of an object;

optical image generation means being moved such that every point on an image formed on said solid-state imaging device moves on the circumferences of a circle having a radius, and for generating optical transfer functions;

control means for controlling said generating means for changing said radius alternately to change the optical transfer functions generated by said generating means so that a luminance-component image is formed at a different radius from a color-component image;

image forming means forming the luminance-component image and the color-component image by using the optical transfer functions on said imaging means;

storing means for storing the luminance-component and color component images formed by said image forming means; and combining means for combining the luminance-component and color component images read out from said storing means according to an image-generating operation to produce a single image of the object.

6. The image-taking system according to claim 5, wherein said image generating means generates the luminance-component and color-component images by placing/removing at least one optical device in/from an optical path of said image forming means.

7. An image-taking system according to claim 5, wherein said optical image generating means changes the optical transfer function by changing a relative position of said image generating means in an optical path between the object and said imaging means.

8. An image-taking system comprising:

a solid-state imaging means for taking at least one image of an object;

optical image generating means, being moved such that every point on an image formed on said solid-state imaging device moves on the circumference of a circle having a radius, and for generating optical transfer functions;

control means for controlling said generating means for changing said radius alternately to change the optical transfer functions generated by said generating means so that a luminance-component image is formed at a different radius from a color-component image;

image forming means for forming the luminance-component image and the color-component image by using the optical transfer functions on said solid-state imaging means in response to the generation of the luminance-component image and the color-component image;

converting means for converting the luminance-component image to a luminance signal, and for converting the color-component image to a color component signal;

storing means for storing the luminance signal and the color component signal; and combining means for combining the luminance signal and the color signal stored in said storing means according to an image generating operation to produce an output signal, including means responsive to the output signal for forming a single object of the image.

9. An image-taking method comprising:

an image taking step of taking an image of an object utilizing a solid-state imaging device;

an image-forming step of forming two or more images of the object serially on said solid-state imaging device;

a generating step moving a generating means such that every point on an image formed on said solid-state imaging device moves on the circumference of a circle having a radius, and of generating optical transfer functions;

a control step of controlling said generating step for changing said radius alternately to change the optical transfer functions generated by said generating step so that a luminance-component image is formed at a different radius from a color-component image;

a storing step of storing a plurality of images in order, formed with two or more different optical transfer functions generated by said generating step; and a combining step of forming a single image by combining said plurality of images readout by said storing step according to an image-generating operation.

10. An image-taking method according to claim 9, with at least one of said plurality of images being a luminance-component image taken with an optical transfer function suited to obtain luminance component, at least one of the rest of said plurality of images being a color-component image taken with an optical transfer function suited to obtain color components, and said combining step obtaining a combined image by the use of the luminance component and the color components obtained from said luminance-component image and said color-component image.

* * * * *

UNITED STATES PATENT AND TRADEMARK OFFICE
CERTIFICATE OF CORRECTION

PATENT NO. : 6,100,929
DATED : August 8, 2000
INVENTOR(S) : MASATO IKEDA ET AL.

It is certified that error appears in the above-identified patent and that said Letters Patent is hereby corrected as shown below:

ON THE TITLE PAGE:

[56] References Cited, under FOREIGN PATENT DOCUMENTS

"4142892" should read --4-142892--; and
"6189318" should read --6-189318--.

COLUMN 1:

Line 32, "is" should read --are--;
Line 44, "reduced is" should be deleted; and
Line 47, "increase," should read --increase;--.

COLUMN 3:

Line 6, "a" should read --an--.

COLUMN 4:

Line 62, "optically" should read --optical--.

COLUMN 5:

Line 10, "a" should read --an--;
Line 35, "radium $r_c$" should read --radius $r_c$--.

COLUMN 6:

Line 55, "to" should be deleted.

UNITED STATES PATENT AND TRADEMARK OFFICE
CERTIFICATE OF CORRECTION

PATENT NO.    : 6,100,929
DATED         : August 8, 2000
INVENTOR(S)   : MASATO IKEDA ET AL.

It is certified that error appears in the above-identified patent and that said Letters Patent is hereby corrected as shown below:

COLUMN 8:

Line 47, "circumferences" should read --circumference--.

COLUMN 10:

Line 23, "readout" should read --read out--.

Signed and Sealed this

First Day of May, 2001

Attest:

NICHOLAS P. GODICI

*Attesting Officer*      *Acting Director of the United States Patent and Trademark Office*